(12) United States Patent
Jones et al.

(10) Patent No.: US 8,210,979 B2
(45) Date of Patent: Jul. 3, 2012

(54) DUAL-PISTON NORMALLY-ENGAGED CLUTCH

(75) Inventors: Gary L. Jones, Farmington Hills, MI (US); Farzad Samie, Franklin, MI (US); Chunhao J. Lee, Troy, MI (US); Kumaraswamy V. Hebbale, Troy, MI (US); Andrew L. Bartos, Clarkston, MI (US); John I. Manole, Chesterfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 289 days.

(21) Appl. No.: 12/754,048

(22) Filed: Apr. 5, 2010

(65) Prior Publication Data

US 2011/0245035 A1    Oct. 6, 2011

(51) Int. Cl.
*F16H 31/00*     (2006.01)
*F16D 19/00*     (2006.01)

(52) U.S. Cl. .......................... 475/140; 192/83

(58) Field of Classification Search ................... 475/140
See application file for complete search history.

(56) References Cited

U.S. PATENT DOCUMENTS

| 4,181,042 A | * | 1/1980 | Rau et al. | 475/138 |
| 4,287,781 A | * | 9/1981 | Zenker | 74/375 |
| 4,440,279 A | * | 4/1984 | Schreiner | 192/30 W |

* cited by examiner

*Primary Examiner* — Dirk Wright
(74) *Attorney, Agent, or Firm* — Quinn Law Group, PLLC

(57) ABSTRACT

A normally-engaged clutch is provided having a friction-element with a first side and an opposing second side, a first plate configured for pressing against the friction-element on the first side, and a second plate configured for pressing against the friction-element on the second side. The clutch also includes a biasing device configured to apply a first force to the second plate for pressing the second plate against the friction-element to engage the clutch. Additionally, the clutch includes an apply piston for applying a second force to the first plate, and a release piston for applying a third force to the second plate. The clutch is disengaged when the second plate is pushed away from the friction-element by the third force in the absence of the second force, and is engaged when the first plate is pressed against the friction-element by the second force.

20 Claims, 3 Drawing Sheets

DUAL-PISTON NORMALLY-ENGAGED CLUTCH

TECHNICAL FIELD

The invention relates to normally-engaged clutches for transmissions employed in motor vehicles.

BACKGROUND OF THE INVENTION

Automotive transmissions often have hydraulically-actuated, selectively engagable torque-transmitting mechanisms, referred to as clutches. The clutches may be stationary-type clutches (i.e., brakes), or rotating-type clutches. Typically, interspaced sets of friction plates and reaction plates are placed in contact with one another when the clutch is engaged, to cause common rotation (in the case of the rotating-type clutch) or grounding (in the case of the stationary-type clutch) of components connected with the respective sets of plates.

Hydraulically-actuated clutches have inherent spin losses which reduce fuel economy. Spin losses are caused by fluid in the clutch increasing resistance to rotation of the components connected with the clutch plates. Additionally, such hydraulically-actuated clutches are not engagable until sufficient fluid pressure is available from a transmission pump. Typically, a main transmission pump is driven by an engine that is connected with the transmission or is driven by a rotatable transmission member, and so is indirectly driven by the engine.

When the engine is rotating at relatively low speeds, or if the engine is completely off, as may be the case with an engine having an automatic start/stop capability, the main pump may not supply sufficient hydraulic pressure. Accordingly, auxiliary pumps, such as electrically-powered pumps, are sometimes employed to provide the requisite hydraulic pressure when pressure from the main pump is insufficient.

SUMMARY OF THE INVENTION

A mechanically-biased, normally-engaged clutch is provided. The clutch includes a friction-element with a first side and an opposing second side, a first plate configured for pressing against the friction-element on the first side, and a second plate configured for pressing against the friction-element on the second side. The clutch also includes a biasing device configured to apply a first force to the second plate for pressing the second plate against the friction-element to engage the clutch. Additionally, the clutch includes an apply piston for applying a second force to the first plate, and a release piston for applying a third force to the second plate. The clutch is disengaged when the second plate is pushed away from the friction-element by the third force in the absence of the second force, and is engaged when the first plate is pressed against the friction-element by the second force.

The biasing device may be configured to apply the first force to the second plate without application of power. The biasing device may be a Belleville spring. The Belleville spring may be compressed in order to apply the first force to the second plate, and may furthermore be compressed by the third force in the absence of the second force.

The release piston may be configured to receive a hydraulic pressure, to thereby apply the third force to the second plate to disengage the clutch. Similarly, the apply piston may be configured to receive a hydraulic pressure, to thereby apply the second force to the first plate to engage the clutch.

A vehicle having an engine with an automatic start/stop capability, along with a transmission having the above described clutch is also disclosed.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
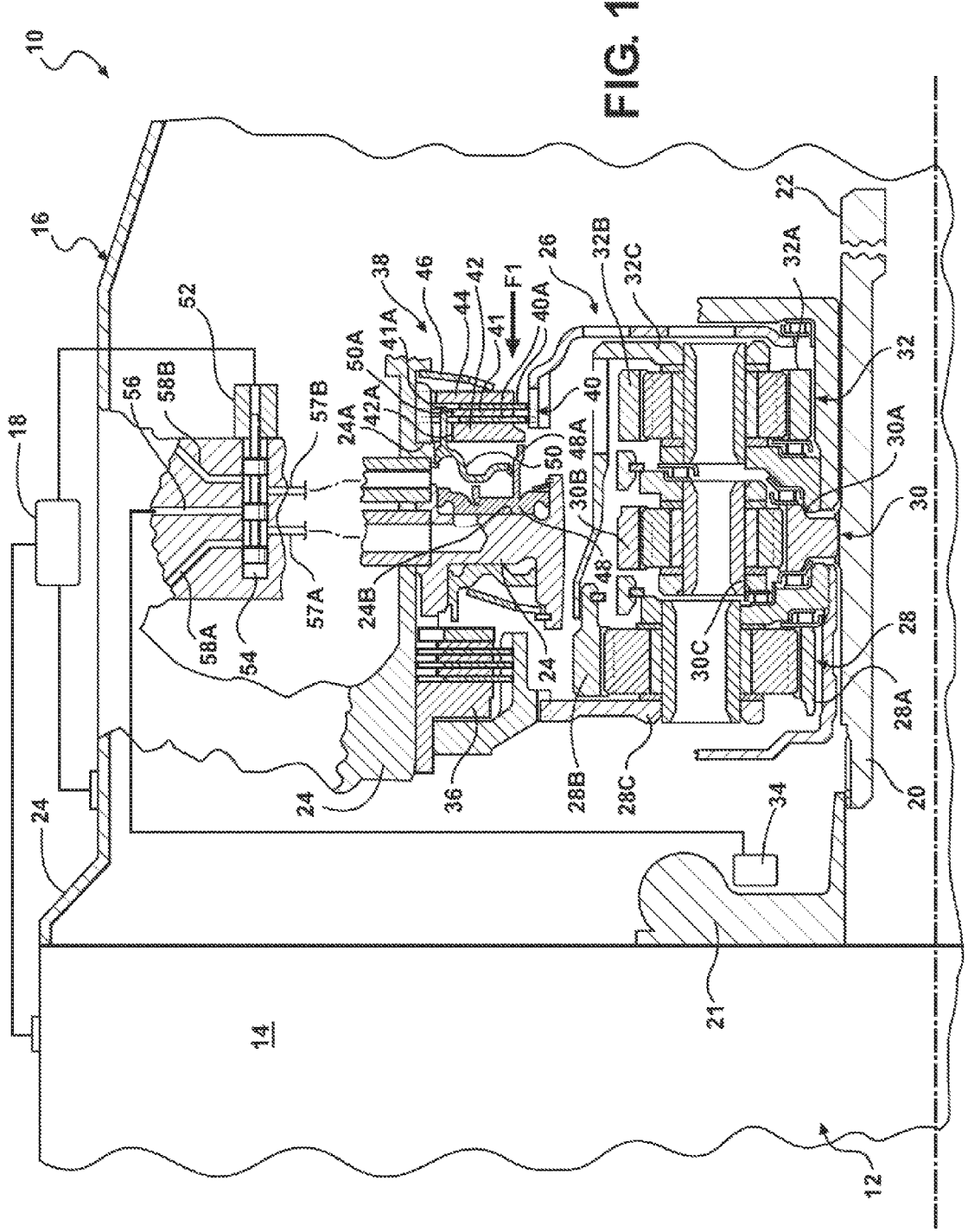
FIG. 1 is a schematic partial illustration of a vehicle powertrain including a partial illustration of a transmission having a mechanically-biased clutch in its normally-engaged state.
Figure 2:
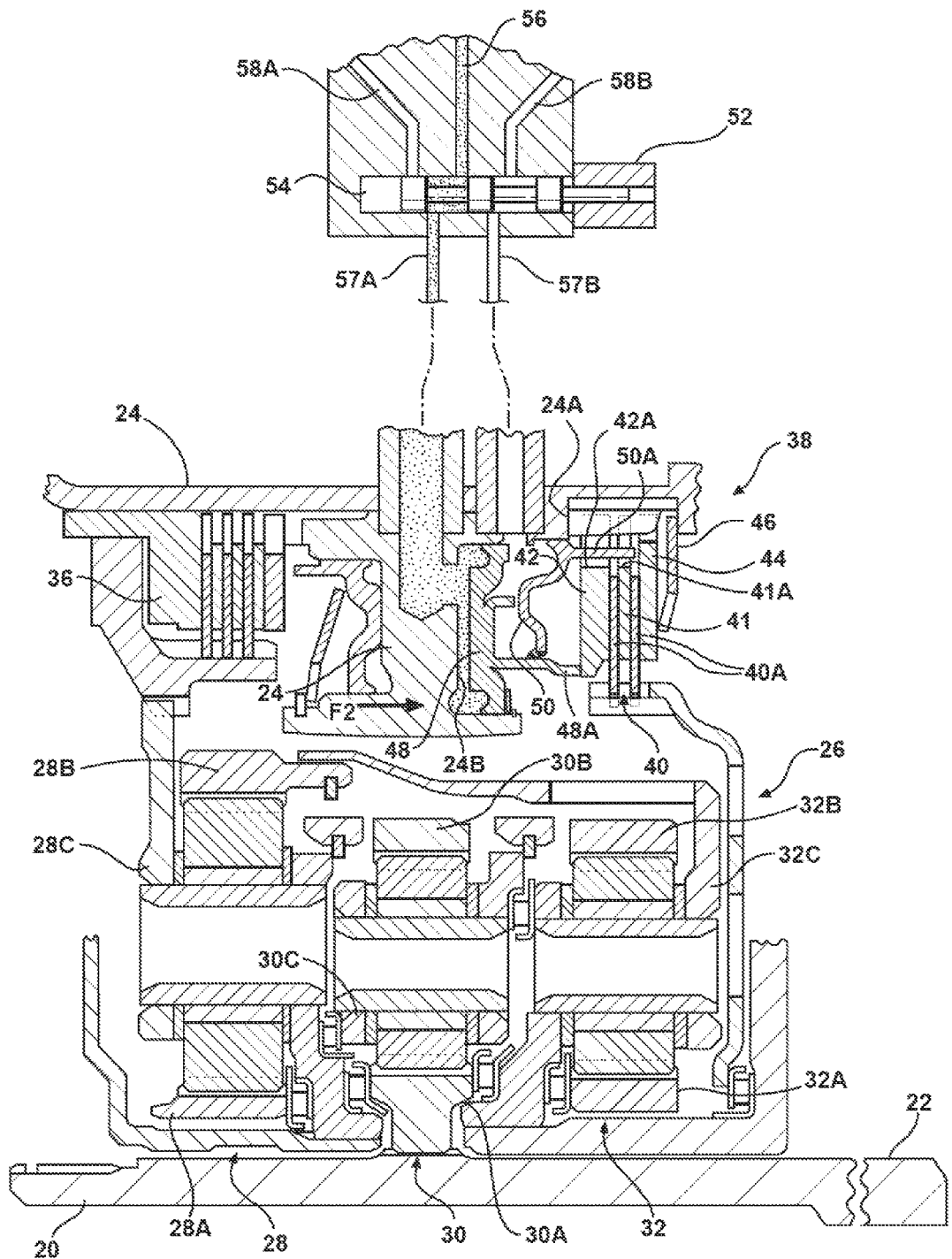
FIG. 2 is a schematic partial illustration of a vehicle powertrain of FIG. 1, with mechanically-biased, normally-engaged clutch in a hydraulically engaged state.
Figure 3:
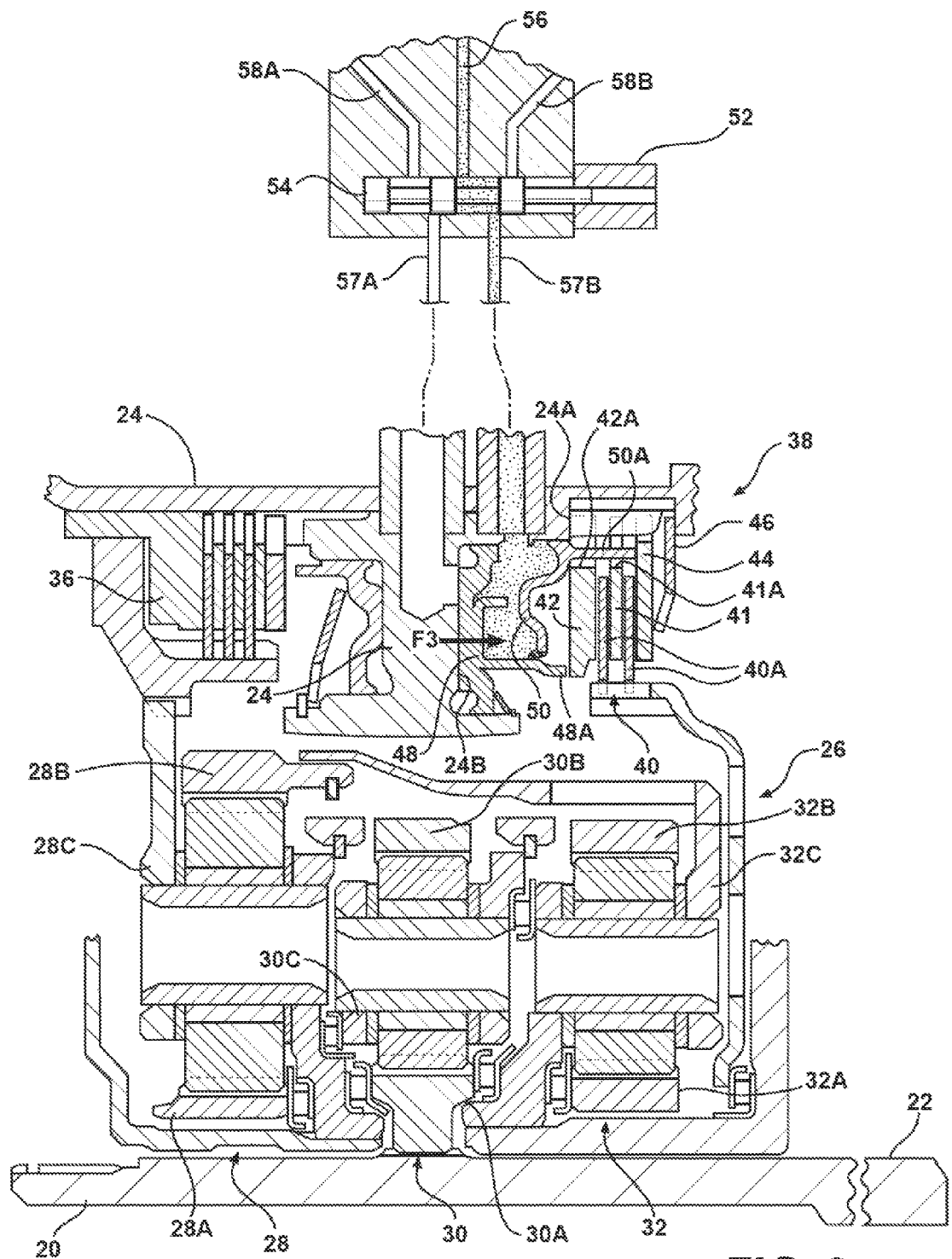
FIG. 3 is a schematic partial illustration of a vehicle powertrain of FIG. 1, with mechanically-biased, normally-engaged clutch in a hydraulically disengaged state.

Referring to the drawings, wherein like reference numbers refer to like components, FIGS. 1-3 show a vehicle 10. Vehicle 10 includes a powertrain 12 having an engine 14 and a transmission 16 for transmitting engine torque to driven wheels (not shown) of the vehicle. As provided, engine 14 includes an automatic start/stop function or capability, which may automatically shut down and restart the vehicle's engine 14 to reduce the amount of time the engine spends idling, thereby improving fuel economy. Engine start/stop capability is advantageous for vehicles which spend significant amounts of time waiting at traffic lights, or frequently come to a stop in traffic jams. Such a start/stop feature is present in hybrid electric vehicles, typically employing an electric motor/generator (not shown) in addition to engine 14 for propelling the vehicle, but may also be employed in vehicles which lack a hybrid electric powertrain.

Engine 14 is operatively connected to transmission 16, which is configured for receiving power and torque from the engine. Vehicle 10 additionally includes a controller 18, which may be a transmission control module (TCM) adapted for controlling operation of transmission 16. Controller 18 may also be configured as a powertrain controller, adapted for controlling operation of the entire powertrain 12. Transmission 16 includes an input member, shown as an input shaft 20 operatively connected to engine 14 via a torque converter 21, an output member, shown as an output shaft 22, and a stationary member, shown as a transmission housing 24. Engine torque is transferred between the input shaft 20 and the output shaft 22 via a planetary gearing arrangement 26, as known by those skilled in the art.

In FIGS. 1-3, planetary gearing arrangement 26 is shown to include three planetary gear sets, 28, 30, and 32. Each planetary gear set 28, 30, and 32 includes a sun gear, 28A, 30A, 32A, a ring gear, 28B, 30B, 32B, and a carrier member 28C, 30C, 32C, respectively. Various interconnections between planetary gear sets 28, 30, and 32 via their respective sun gears, ring gears, and carrier members are possible, as known by those skilled in the art, in order to achieve the desired transmission gear ratios between input shaft 20 and output shaft 22. Transmission 16 also includes a hydraulic pump 34 adapted to supply pressurized fluid to various transmission clutches, such as clutch 36, and servos via dedicated fluid passages (not shown).

FIGS. 1-3 additionally depict a mechanically-biased, normally-engaged clutch 38 disposed within transmission 16. Clutch 38 transmits torque when in the engaged state, and does not transmit torque in the disengaged state. Clutch 38 may be employed to transmit torque between engine 14 and output shaft 22 in a low or first gear ratio typically employed for launching the vehicle 10. Additionally, clutch 38 may be configured to transmit torque between any one of gear members 28A-C, 30A-C, and 32A-C and any other of the gear members of the planetary gearing arrangement 26, as well as between one of the gear members and the transmission housing 24, or between engine 14 and transmission 16.

Clutch 38 includes a friction-element, shown as a clutch pack 40. Clutch pack 40 includes interspaced sets of friction plates 40A and reaction plate(s) 41 placed in contact with one another when the clutch is engaged, as known by those skilled in the art. Clutch 38 also includes a first, or apply plate 42, which functions as an apply member or a plate that is configured for pressing against the clutch pack 40 on the first side 40A. Additionally, clutch 38 includes a second plate 44, which functions as a backing member or a plate that is configured for pressing against the clutch pack 40. Clutch 38 also includes a Belleville spring 46, which is a biasing device configured to apply a first force F1 to the second, or backing plate 44, to thereby clamp clutch pack 40 between first plate 42 and the second plate to engage the clutch (shown in FIG. 1). Housing 24 includes a specially formed or machined shoulder 24A for first plate 42 to contact and seat against. The shoulder 24A provides a reaction surface for the first plate 42, when the first plate shifts in response to the first force F1.

Clutch 38 also employs an apply piston 48 adapted to apply a second force F2 to the first plate 42 (shown in FIG. 2), and a release piston 50 adapted to apply a third force F3 to the second plate 44 (shown in FIG. 3). The apply piston 48 is retained on its inner and outer diameters by the housing 24. When apply piston 48 is fully retracted, the apply piston seats against a reaction surface 24B of transmission housing 24. There is sufficient clearance between apply piston 48 in its fully retracted state and first plate 42 to permit the clutch pack 40 to be clamped when the first force F1 is applied, and the first plate 42 contacts and seats against shoulder 24A. When release piston 50 is fully retracted, the release piston can rest against the apply piston 48.

The release piston 50 is retained at its outer diameter by transmission housing 24, and at its inner diameter by a ring 48A formed on the surface of the apply piston 48. Release piston 50 includes a set of fingers 50A that protrude through opening 42A in the first plate 42, and through opening 41A in the reaction plate 41, thereby permitting the release piston to make contact with and transmit the third force F3, as shown in FIG. 3, to the second plate 44. There is sufficient clearance between fingers 50A and second plate 44 to permit the clutch pack 40 to be clamped when the first force F1 is applied and the first plate 42 contacts and seats against the shoulder 24A. As can be seen from FIGS. 1-3, force F1 is applied in a direction that is opposite to that of forces F2 and F3. Clutch 38 is engaged when the first plate 42 is pressed against the clutch pack 40 by the second force F2 (as shown in FIG. 2). On the other hand, clutch 38 is disengaged when the third force F3 is applied to the second plate 44 in the absence of the second force F2 (as shown in FIG. 3).

In the as-assembled, pre-compressed state, Belleville spring 46 applies the first force F1 to second plate 44 to clamp clutch pack 40 between the first plate 42 and second plate 44, and, therefore, keeps the clutch 38 normally-engaged. During application of the first force F1, first plate 42 contacts and seats against shoulder 24A, thereby permitting clutch 38 to be normally-engaged. As such, clutch 38 is kept normally-engaged by Belleville spring 46 without application of power, be that hydraulic, pneumatic or electrical power. The engagement of clutch 38 provided solely by the first force F1 from Belleville spring 46 is typically sufficient to keep the transmission 16 in gear when the engine is off. Additionally, first force F1 is also sufficient to transmit relatively low torque-output of engine 14 that is generally seen during engine start-up and at lower engine speeds. The application of the third force F3 by release piston 50, as described above, compresses Belleville spring 46 beyond its as-assembled, pre-compressed state and acts to retain such additional compression. In the instance that the second force F2 is not applied, such additional compression of Belleville spring 46 permits the friction plates 40A and reaction plate(s) 41 of clutch pack 40 to separate from each other and also from backing plate 44, to thereby disengage clutch 38.

While the clamping provided solely by Belleville spring 46 may be sufficient to transmit relatively low torque-output of engine 14, higher engine torque, as typically seen at elevated engine speeds and larger throttle openings, may demand a higher degree of clamping. Force F2 provided by apply piston 48 is intended to be higher than the first force F1, such that a higher degree of clamping, and therefore a more secure engagement of clutch 38 may be generated than is possible with the pre-compressed Belleville spring 46.

Controller 18, described above, controls operation of a valve 52 located remotely from clutch 38. Valve 52 is configured to regulate the flow of hydraulic fluid received from the fluid pump 34, and pressurize either the apply piston 48 or the release piston 50. The fluid pressure is employed to selectively actuate either the apply piston 48 or the release piston 50, depending on whether clutch 38 is desired to be engaged or disengaged, respectively. Typically, the lowest practicable fluid pressure is chosen, in order to limit spin losses in the transmission 16, and increase fuel economy of the vehicle 10. Valve 52 is configured to shift within a bore 54 to permit one of the apply piston 48 and release piston 50 to be pressurized via a fluid supply passage 56 through passages 57A and 57B, respectively, while relieving pressure inside the other of the two pistons via one of two separate vent passages 58A and 58B. Valve 52 may also assume a neutral position where both pistons 48 and 50 are permitted to relieve pressure via vent passages 58A and 58B.

The mechanically-biased, normally-engaged clutch 38 facilitates engine stop/start function without the use of any auxiliary electric pump or accumulator. In a typical transmission paired with engine 14 employing stop/start technology, when the vehicle is stationary, the engine ignition is turned on, but the engine is turned off, while the transmission is in the selected drive mode and the vehicle operator driver is actuating the vehicle brakes. In such an instance, the transmission will be in a low or first gear operating mode requiring hydraulic pressure. As soon as the driver releases the brake pedal, the engine automatically starts, and an auxiliary electric pump will commence providing hydraulic pressure to engage and hold the input clutch. Such prompt hydraulic pressure typically permits the vehicle to accelerate as soon as the vehicle operator depresses the accelerator pedal. Another approach is to replace the auxiliary electric pump with an accumulator to facilitate prompt input clutch engagement. However, both approaches are costly, often require additional vehicle packaging space (which is typically at a premium), and have a direct impact on fuel efficiency because of the additional power required for their operation. Clutch 38 may be used as an effective alternative to both approaches described above.

In the case of vehicle 10, when the vehicle brakes are released, engine 14 will start, and controller 18 will direct the valve 52 to send pressurized hydraulic fluid from pump 34 to the apply piston 48. While the hydraulic pressure is building up in supply passage 56 and passage 57A, clutch 38 remains engaged via first force F1 provided by Belleville spring 46, as shown in FIG. 1. As illustrated in FIG. 2, once built up in supply passage 56 and passage 57A, the fluid pressure will shift apply piston 48 via second force F2 toward first plate 42, which will in turn compress clutch pack 40 against second plate 44, and compress and flatten Belleville spring 46. In such a mode, the clamping and holding torque capacity of clutch 38 is equivalent to the hydraulic pressure controlled by the TCM. Following such engagement of clutch 38, transmission 16 may proceed through other drive gears that require the clutch 38 to be on, as vehicle operation dictates.

When disengagement of clutch 38 is required for a particular operating mode in transmission 16, controller 18 will direct valve 52 to send pressurized hydraulic fluid to the release piston 50, while simultaneously relieving the hydraulic pressure from the apply piston 48. As illustrated in FIG. 3, the hydraulic pressure will be directed to passage 57B to shift the apply piston 48 via third force F3 in the direction away from Belleville spring 46, as well as shift the release piston 50 toward the Belleville spring in order to contact the second plate 44 and compress and flatten the Belleville spring. Consequently, clutch pack 40 will no longer be squeezed between the first and second plates 42, 44, which results in the clutch 38 being disengaged.

Overall, because clutch 38 is a mechanically-biased normally-engaged device, one or more such clutches may be used inside a transmission to decrease spin losses and hydraulic pressure requirements, and thus increase fuel economy.

While the best modes for carrying out the invention have been described in detail, those familiar with the art to which this invention relates will recognize various alternative designs and embodiments for practicing the invention within the scope of the appended claims.

The invention claimed is:

1. A mechanically-biased normally-engaged clutch comprising:
   a friction-element having a first side and an opposing second side;
   a first plate configured for pressing against the friction-element on the first side;
   a second plate configured for pressing against the friction-element on the second side;
   a biasing device configured to apply a first force to the second plate, to thereby press the second plate against the friction-element and engage the clutch;
   an apply piston adapted to apply a second force to the first plate; and
   a release piston adapted to apply a third force to the second plate;
   wherein:
      in the absence of the second force, the second plate is pushed away from the friction-element by the third force to disengage the clutch; and
      the first plate is pressed against the friction-element by the second force to engage the clutch.

2. The clutch of claim 1, wherein the biasing device is configured to apply the first force to the second plate without application of power.

3. The clutch of claim 2, wherein the biasing device is a Belleville spring.

4. The clutch of claim 3, wherein the Belleville spring is compressed in order to apply the first force to the second plate.

5. The clutch of claim 3, wherein the Belleville spring is compressed by the third force in the absence of the second force.

6. The clutch of claim 1, wherein the release piston is configured to receive a hydraulic pressure, to thereby apply the third force to the second plate to disengage the clutch.

7. The clutch of claim 1, wherein the apply piston is configured to receive a hydraulic pressure, to thereby apply the second force to the first plate to engage the clutch.

8. A transmission configured for receiving power from an engine, the transmission comprising:
   an input member connectable with the engine;
   an output member;
   a stationary member;
   a plurality of gear members operatively connected between the input member and the output member; and
   a mechanically-biased normally-engaged clutch, the clutch configured to transmit torque between one of the gear members and another of the gear members, between said one of the gear members and the stationary member, or between the engine and the transmission when in the engaged state, and configured to not transmit torque when in the disengaged state, the clutch including:
      a friction-element having a first side and an opposing second side;
      a first plate configured for pressing against the friction-element on the first side;
      a second plate configured for pressing against the friction-element on the second side;
      a biasing device configured to apply a first force to the second plate, to thereby press the second plate against the friction-element and engage the clutch;
      an apply piston adapted to apply a second force to the first plate; and
      a release piston adapted to apply a third force to the second plate;
      wherein:
         in the absence of the second force, the second plate is pushed away from the friction-element by the third force to disengage the clutch; and
         the first plate is pressed against the friction-element by the second force to engage the clutch.

9. The transmission of claim 8, wherein the biasing device is a Belleville spring.

10. The transmission of claim 8, further comprising a transmission pump driven by one of the input member and the output member, wherein the pump is configured to supply hydraulic pressure to the apply piston for applying the second force and to the release piston for applying the third force, and wherein the transmission is characterized by the absence of any additional pump that is powered when the engine is not running.

11. The transmission of claim 8, wherein the biasing device is configured to apply the first force to the second plate without application of power.

12. The transmission of claim 9, wherein the Belleville spring is compressed in order to apply the first force to the second plate.

13. The transmission of claim 9, wherein the Belleville spring is compressed by the third force in the absence of the second force.

14. The transmission of claim 8, wherein the release piston is configured to receive a hydraulic pressure, to thereby apply the third force to the second plate to disengage the clutch.

15. The transmission of claim 8, wherein the apply piston is configured to receive a hydraulic pressure, to thereby apply the second force to the first plate to engage the clutch.

16. A vehicle having an engine with an automatic start/stop capability, the vehicle comprising:
- a transmission configured for receiving power from the engine:
- transmission configured for receiving power from an engine comprising:
- an input member connectable with the engine;
- an output member;
- a stationary member;
- a plurality of gear members operatively connected between the input member and the output member; and
- a mechanically-biased normally-engaged clutch, the clutch configured to transmit torque between one of the gear members and another of the gear members, between said one of the gear members and the stationary member, or between the engine and the transmission when in the engaged state, and configured to not transmit torque when in the disengaged state, the clutch including:
  - a friction-element having a first side and an opposing second side;
  - a first plate configured for pressing against the friction-element on the first side;
  - a second plate configured for pressing against the friction-element on the second side;
  - a biasing device configured to apply a first force to the second plate, to thereby press the second plate against the friction-element and engage the clutch for the automatic engine start;
  - an apply piston adapted to apply a second force to the first plate; and
  - a release piston adapted to apply a third force to the second plate;
  - wherein:
    - in the absence of the second force, the second plate is pushed away from the friction-element by the third force and the clutch is disengaged for the manual engine start; and
    - the first plate is pressed against the friction-element by the second force and the clutch is engaged for the automatic engine start.

17. The vehicle of claim 16, wherein the biasing device is a Belleville spring, and the Belleville spring is compressed in order to apply the first force to the second plate, and compressed by the third force in the absence of the second force.

18. The vehicle of claim 16, further comprising a transmission pump driven by one of the input member and the output member, wherein the pump is configured to supply hydraulic pressure to the apply piston for applying the second force and to the release piston for applying the third force, and wherein the transmission is characterized by the absence of any additional pump that is powered when the engine is not running.

19. The vehicle of claim 16, wherein the biasing device is configured to apply the first force to the second plate without application of power.

20. The vehicle of claim 16, wherein the release piston is configured to receive a hydraulic pressure, to thereby apply the third force to the second plate to disengage the clutch, and the apply piston is configured to receive a hydraulic pressure, to thereby apply the second force to the first plate to engage the clutch.

* * * * *